March 2, 1954 — L. C. PACHNER — 2,670,557
DEVICE FOR DIPPING AND HOLDING MINNOWS
Filed April 19, 1952
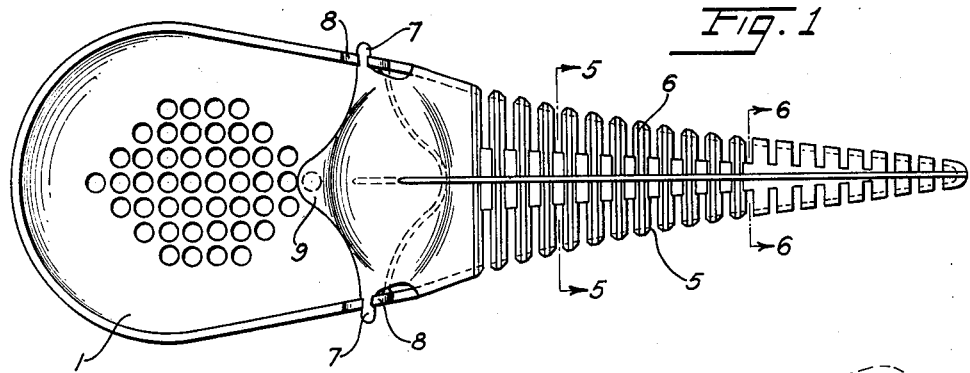
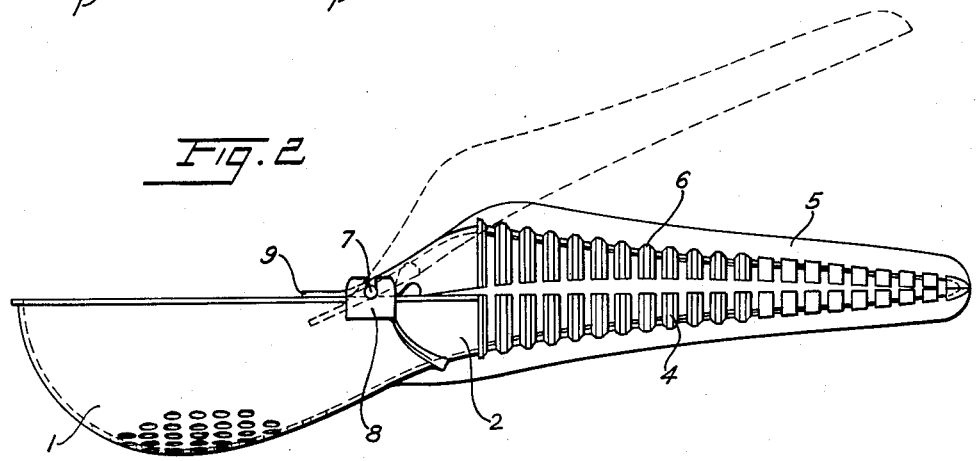
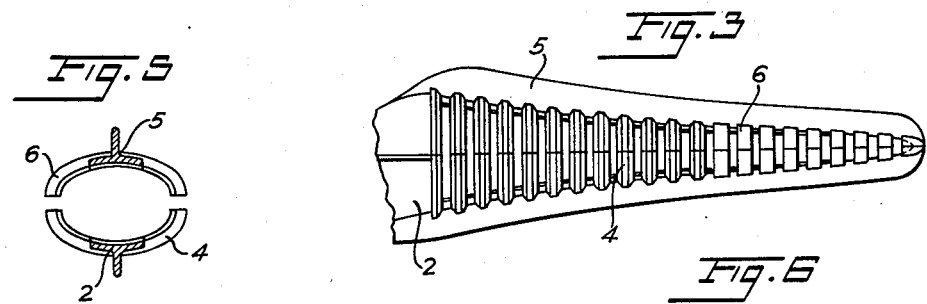
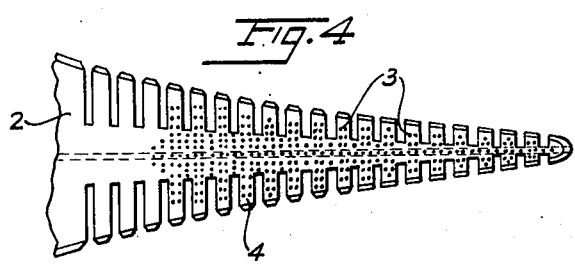
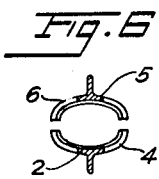
INVENTOR.
LEO C. PACHNER
BY Harold E. Stonebraker
his ATTORNEY.

Patented Mar. 2, 1954

2,670,557

UNITED STATES PATENT OFFICE 2,670,557

DEVICE FOR DIPPING AND HOLDING MINNOWS

Leo C. Pachner, Momence, Ill., assignor to P & K Incorporated, Momence, Ill., a corporation of Illinois Application April 19, 1952, Serial No. 283,164

6 Claims. (Cl. 43—4)

This invention relates to a device for dipping and holding minnows and has for its purpose to afford a practical construction that can be economically manufactured and will function to dip a minnow readily from a pail or container and thereafter grip and retain the minnow in such position that it can be readily engaged at any selected part by a hook, after which the hook and minnow can be instantly removed, the several operations being performed without touching the minnow by the hands of the fisherman.

Various efforts have been made in the past to provide devices for holding minnows while fastening on a hook, but these have all been open to one or more objections chief among which has been the failure to provide proper facilities for gripping or holding the minnow while the hook is being attached, and it is a particular object of the invention to afford a construction in which the minnow after being dipped from a receptacle can readily be moved by gravity into a position in a holding device where it can be firmly gripped and held so as to enable hooking at any desired point while at the same time the pressure required in the gripping action and the manner of its application is so delicately balanced as to insure preventing movement of the minnow during the hooking operation while preventing any excess pressure or injury to the minnow.

As a result of the arrangement embodying the invention, a minnow can be firmly held while engaging a hook, and when released is as lively and active as when first taken from the water, so that the gripping action necessary for holding the minnow in place while the hook is applied is not such as to bring about injury to the minnow, and an additional purpose of the invention is to afford a structure that lends itself effectively and conveniently to gripping the minnow between yieldable or flexible gripping portions so designed as to enable a firm hold on the minnow and prevent its movement while preventing excess or undue pressure.

Another purpose of the invention is to afford an arrangement that enables manufacturing a minnow scoop of the general character set forth from transparent plastic material which is sufficiently yieldable and flexible to permit the gripping portions to be yieldably engaged with the minnow endwise of the latter and to hold the minnow so that a hook can be engaged at any point endwise of its body.

Still an additional object of the invention is to afford an arrangement in which two cooperating oppositely disposed gripping portions can be made of plastic material and sufficiently yieldable to permit one to be detachably and pivotally engaged with the other by spreading the one plastic member sufficiently to receive pivotal connections of the other plastic member, which is thus held in detachable relationship.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view showing a preferred embodiment of the invention with the minnow gripping portions in closed position;

Fig. 2 is a view in side elevation of the same, with the pivoted minnow gripping portions appearing in dotted lines in partially open position;

Fig. 3 is a side elevation, partially broken away, showing the minnow gripping portions when squeezed together to hold a minnow therebetween;

Fig. 4 is a detail view in elevation of the inner surface of one of the minnow gripping portions;

Fig. 5 is a transverse sectional view on the line 5—5 of Fig. 1, looking in the direction indicated, showing only the contour in the plane of the section with the protuberances omitted, and Fig. 6 is a transverse sectional view on the line 6—6 of Fig. 1, looking in the direction indicated, showing only the contour in the plane of the section with the protuberances omitted.

Referring more particularly to the drawings in which like reference numerals refer to the same parts throughout the several views, the structure comprises a body portion made from slightly yieldable transparent plastic material and including a bowl-shaped dipper 1 having a perforate or otherwise foraminate bottom through which water can be drained, the dipper 1 being open at one side and merging into an integral elongated tapering minnow gripping portion 2 that is open on top and formed by a thin wall that is generally curved in cross-section and slightly concaved endwise at its sides, while its longitudinal central area is provided with a multiplicity of inwardly projecting points or protuberances 3 as shown for a purpose that will appear hereinafter.

The minnow gripping portion 2 is closed at its outer end and is provided with a series of transverse slots or openings extending from its edges to points near its longitudinal center and affording a multiplicity of spaced, endwise curved flexible tongues 4.

Pivotally supported on the body portion and overlying the gripping portion 2 is a second minnow gripping portion open on the bottom and indicated generally at 5 also formed from a sheet of transparent plastic material that is slightly yieldable. The minnow gripping portion 5 is symmetrical as to its endwise and transverse formation with the first mentioned gripping portion 2 and has transverse slots affording the flexible spaced tongues 6.

The minnow gripping portion 5 is provided with pins, trunnions or projections 7 formed integral therewith at its large end and pivotally engaging the bearings 8 formed at the opposite edges of the side walls of the dipper as shown, the pins 7 being removably and pivotally engageable with the bearings 8 by slightly spreading the walls of the dipper and springing the pins into engagement with the supporting bearings. 9 designates a downwardly and inwardly extending handle or finger portion formed at the inner end of the pivoted minnow gripping portion 5 for engaging the latter and elevating it out of engagement with the minnow when the latter is to be removed. The gripping portion 5 is provided with protuberances or points extending inwardly from its surface, similarly to the aforementioned projections 3, and is adapted to swing about an axis perpendicular to the longitudinal axis of the body portion.

In operation, a minnow is brought into the dipper by dipping the latter into a minnow pail or other container and then with the two gripping portions forming a handle, the device is elevated to a vertical position, permitting the minnow to slide downwardly between the gripping portions until it reaches a point where it can move no further, depending upon the size of the minnow, the structure being designed to accommodate minnows of any usual size from smallest to largest, as generally employed in conventional fishing. As the minnow drops downwardly between the gripping portions, it is engaged by the points or protuberances 3 on the central areas of the gripping portions and thereby held against return movement that might otherwise take place. The tongues 6 of the gripping portion 5 are opposite to and normally spaced from the tongue 4 of the other gripping portion 2 at points spaced from the ends of the gripping portions when the gripping portions are in contact at their small ends and otherwise free from pressure, see Fig. 2, and when the minnow has reached the limit of its downward movement, it is firmly gripped throughout the length of its body by slightly squeezing together the gripping portions until the flexible tongues 6 engage the tongues 4.

While the gripping portions are thus held together with sufficient pressure on the minnow to hold it against movement, but without excess pressure or injury to the minnow, a hook can be inserted through any one of the spaces between the various tongues of the gripping portions and at the corresponding portion of the minnow, and when the hook is thus engaged, the movable gripping portion 5 is elevated by pressing the finger portion 9, and the minnow is then free to be removed with the hook attached.

While the invention has been described with reference to the construction shown, it is not confined to the details herein disclosed and this application is intended to cover such modifications or departures as may come within the purposes of the improvement or the scope of the following claims.

I claim:

1. A device of yieldable plastic material for dipping and holding minnows comprising a body portion including a bowl-shaped dipper having a perforate bottom and a tapered minnow gripping portion integral therewith, said body portion being open at the top and symmetrical throughout its length on both sides of a vertical plane passing through its longitudinal axis, said dipper being open at one side and merging into the large end of said minnow gripping portion which is adjacent to and formed by a continuation of the side walls of said dipper, the top edges of the dipper and said minnow-gripping portion being located in a single plane, and a second minnow gripping portion overlying the first mentioned gripping portion and having its large end pivotally supported at opposite edges of the body portion at the large end of the first mentioned minnow gripping portion thereby having movement about an axis perpendicular to the longitudinal axis of the body portion, said last mentioned minnow gripping portion being open on the bottom throughout its length and the minnow gripping portions having a symmetrical and generally semi-elliptical cross-sectional configuration and a multiplicity of transverse slots in their side walls extending from points near said vertical plane passing through the longitudinal axis to the side edges affording a series of spaced tongues, the minnow gripping portions affording a generally tapering enclosure and the tongues of one gripping portion being opposite to the tongues of the other gripping portion and acting to limit the closing movement of the gripping portions toward each other, the tongues of one gripping portions being spaced from the tongues of the other gripping portion at points spaced from the ends of the gripping portions when the gripping portions are in contact at their small ends and otherwise free from pressure and the gripping portions being yieldable whereby when squeezed toward one another said tongues are brought into contact throughout the length of the gripping portions.

2. A device of yieldable plastic material for dipping and holding minnows comprising a body portion including a bowl-shaped dipper having a perforate bottom and a tapered minnow gripping portion integral therewith, said body portion being open at the top and symmetrical throughout its length on both sides of a vertical plane passing through its longitudinal axis, said dipper being open at one side and merging into the large end of said minnow gripping portion which is adjacent to and formed by a continuation of the side walls of said dipper, the top edges of the dipper and said minnow-gripping portion being located in a single plane, and a second minnow gripping portion overlying the first mentioned gripping portion and having its large end pivotally supported at opposite edges of the body portion at the large end of the first mentioned minnow gripping portion thereby having movement about an axis perpendicular to the longitudinal axis of the body portion, said last mentioned minnow gripping portion being open on the bottom throughout its length and the minnow gripping portions having a symmetrical and generally semi-elliptical cross-sectional configuration and a multiplicity of transverse slots in their side walls extending from points near said vertical plane passing through the longitudinal axis to the side edges affording a series of spaced tongues, the minnow gripping portions affording a generally tapering enclosure and the tongues of one gripping portion being opposite to the tongues of the other gripping portion and acting to limit the closing movement of the gripping portions toward each other, the tongues of one gripping portion being spaced from the tongues of the other gripping portion at points spaced from the ends of the gripping portions when the gripping portions are in contact at their small ends and otherwise free from pressure and the gripping portions being yieldable whereby when squeezed toward one another said tongues are brought into contact throughout the length of the gripping portions, the inner surfaces of said minnow gripping portions having inwardly extending projections engageable with a minnow positioned therebetween.

3. A device of yieldable plastic material for dipping and holding minnows comprising a body portion including a bowl-shaped dipper having a perforate bottom and a tapered minnow gripping portion integral therewith, said body portion being open at the top and symmetrical throughout its length on both sides of a vertical plane passing through its longitudinal axis, said dipper being open at one side and merging into the large end of said minnow gripping portion which is adjacent to and formed by a continuation of the side walls of said dipper, the top edges of the dipper and said minnow-gripping portion being located in a single plane, and a second minnow gripping portion overlying the first mentioned gripping portion and having its large end pivotally supported at opposite edges of the body portion at the large end of the first mentioned minnow gripping portion thereby having movement about an axis perpendicular to the longitudinal axis of the body portion, said last mentioned minnow gripping portion being open on the bottom throughout its length and the minnow gripping portions having a symmetrical and generally semi-elliptical cross-sectional configuration and a multiplicity of transverse slots in their side walls extending from points near said vertical plane passing through the longitudinal axis to the side edges affording a series of spaced tongues, the minnow gripping portions affording a generally tapering enclosure and the tongues of one gripping portion being opposite to the tongues of the other gripping portion and acting to limit the closing movement of the gripping portions toward each other, the tongues of one gripping portion being spaced from the tongues of the other gripping portion at points spaced from the ends of the gripping portions when the gripping portions are in contact at their small ends and otherwise free from pressure and the gripping portions being yieldable whereby when squeezed toward one another said tongues are brought into contact throughout the length of the gripping portions, the walls of the minnow gripping portions being slightly concave at their sides when viewed from above.

4. A device of yieldable plastic material for dipping and holding minnows comprising a body portion including a bowl-shaped dipper having a perforate bottom and a tapered minnow gripping portion integral therewith, said body portion being open at the top and symmetrical throughout its length on both sides of a vertical plane passing through its longitudinal axis, said dipper being open at one side and merging into the large end of said minnow gripping portion which is adjacent to and formed by a continuation of the side walls of said dipper, the top edges of the dipper and said minnow gripping portion being located in a single plane, and a second minnow gripping portion overlying the first mentioned gripping portion, bearings formed at the opposite sides of said dipper, pins carried at the large end of the second minnow gripping portion and engaging said bearings, said second minnow gripping portion thereby having movement about an axis perpendicular to the longitudinal axis of the body portion, said last mentioned minnow gripping portion being open on the bottom throughout its length and the minnow gripping portions having a symmetrical and generally semi-elliptical cross-sectional configuration and a multiplicity of transverse slots in their side walls extending from points near said vertical plane passing through the longitudinal axis to the side edges affording a series of spaced tongues, the minnow gripping portions affording a generally tapering enclosure and the tongues of one gripping portion being opposite to the tongues of the other gripping portion and acting to limit the closing movement of the gripping portions toward each other, the tongues of one gripping portion being spaced from the tongues of the other gripping portion at points spaced from the ends of the gripping portions when the gripping portions are in contact at their small ends and otherwise free from pressure and the gripping portions being yieldable whereby when squeezed toward one another said tongues are brought into contact throughout the length of the gripping portions.

5. A device of yieldable plastic material for dipping and holding minnows comprising a body portion including a bowl-shaped dipper having a perforate bottom and a tapered minnow gripping portion integral therewith, said body portion being open at the top and symmetrical throughout its length on both sides of a vertical plane passing through its longitudinal axis, said dipper being open at one side and merging into the large end of said minnow gripping portion which is adjacent to and formed by a continuation of the side walls of said dipper, the top edges of the dipper and said minnow gripping portion being located in a single plane, and a second minnow gripping portion overlying the first mentioned gripping portion, bearings formed at the opposite sides of said dipper, pins carried at the large end of the second minnow gripping portion and engaging said bearings, said second minnow gripping portion thereby having movement about an axis perpendicular to the longitudinal axis of the body portion, said last mentioned gripping portion being open on the bottom throughout its length and the minnow gripping portions having a symmetrical and generally semi-elliptical cross-sectional configuration and a multiplicity of transverse slots in their side walls extending from points near said vertical plane passing through the longitudinal axis to the side edges affording a series of spaced tongues, the minnow gripping portions affording a generally tapering enclosure and the tongues of one gripping portion being opposite to the tongues of the other gripping portion and acting to limit the closing movement of the gripping portions toward each other, the tongues of one gripping portion being spaced from the tongues of the other gripping portion at points spaced from the ends of the gripping portions when the gripping portions are in contact at their small ends and otherwise free from pressure and the gripping portions being yieldable whereby when squeezed toward one another said tongues are brought into contact throughout the length of the gripping portions, the inner surfaces of said minnow gripping portions having inwardly extending projections engageable with a minnow positioned therebetween.

6. A device of yieldable plastic material for dipping and holding minnows comprising a body portion including a bowl-shaped dipper having a perforate bottom and a tapered minnow gripping portion integral therewith, said body portion being open at the top and symmetrical throughout its length on both sides of a vertical plane passing through its longitudinal axis, said dipper being open at one side and merging into the large end of said minnow gripping portion which is adjacent to and formed by a continuation of the side walls fo said dipper, the top edges of the dipper and said minnow gripping portion being located in a single plane, and a second minnow gripping portion overlying the first mentioned gripping portion, bearings formed at the opposite sides of said dipper, pins carried at the large end of the second minnow gripping portion and engaging said bearings, said second minnow gripping portion thereby having movement about an axis perpendicular to the longitudinal axis of the body portion, said last mentioned gripping portion being open on the bottom throughout its length and the minnow gripping portions having a symmetrical and generally semi-elliptical cross-sectional configuration and a multiplicity of transverse slots in their side walls extending from points near said vertical plane passing through the longitudinal axis to the side edges affording a series of spaced tongues, the minnow gripping portions affording a generally tapering enclosure and the tongues of one gripping portion being opposite to the tongues of the other gripping portion and acting to limit the closing movement of the gripping portions toward each other, the tongues of one gripping portion being spaced from the tongues of the other gripping portion at points spaced from the ends of the gripping portions when the gripping portions are in contact at their small ends and otherwise free from pressure and the gripping portions being yieldable whereby when squeezed toward one another said tongues are brought into contact throughout the length of the gripping portions, the inner surfaces of said minnow gripping portions having inwardly extending projections engageable with a minnow positioned therebetween, and the walls of the minnow gripping portions being slightly concave at their sides when viewed from above.

LEO C. PACHNER.

References Cited in the file of this patent

UNITED STATES PATENTS

| Number | Name | Date |
|---|---|---|
| 553,093 | Zapf | Jan. 14, 1896 |
| 741,640 | Ernst | Oct. 20, 1903 |
| 1,325,613 | Beebe | Dec. 23, 1919 |
| 2,428,721 | Peterson | Oct. 7, 1947 |
| 2,531,551 | Brecht et al. | Nov. 28, 1950 |